Aug. 24, 1965 V. F. MICHAEL 3,202,560
PROCESS AND APPARATUS FOR FORMING GLASS-REINFORCED PLASTIC PIPE
Filed Jan. 23, 1961 3 Sheets-Sheet 2
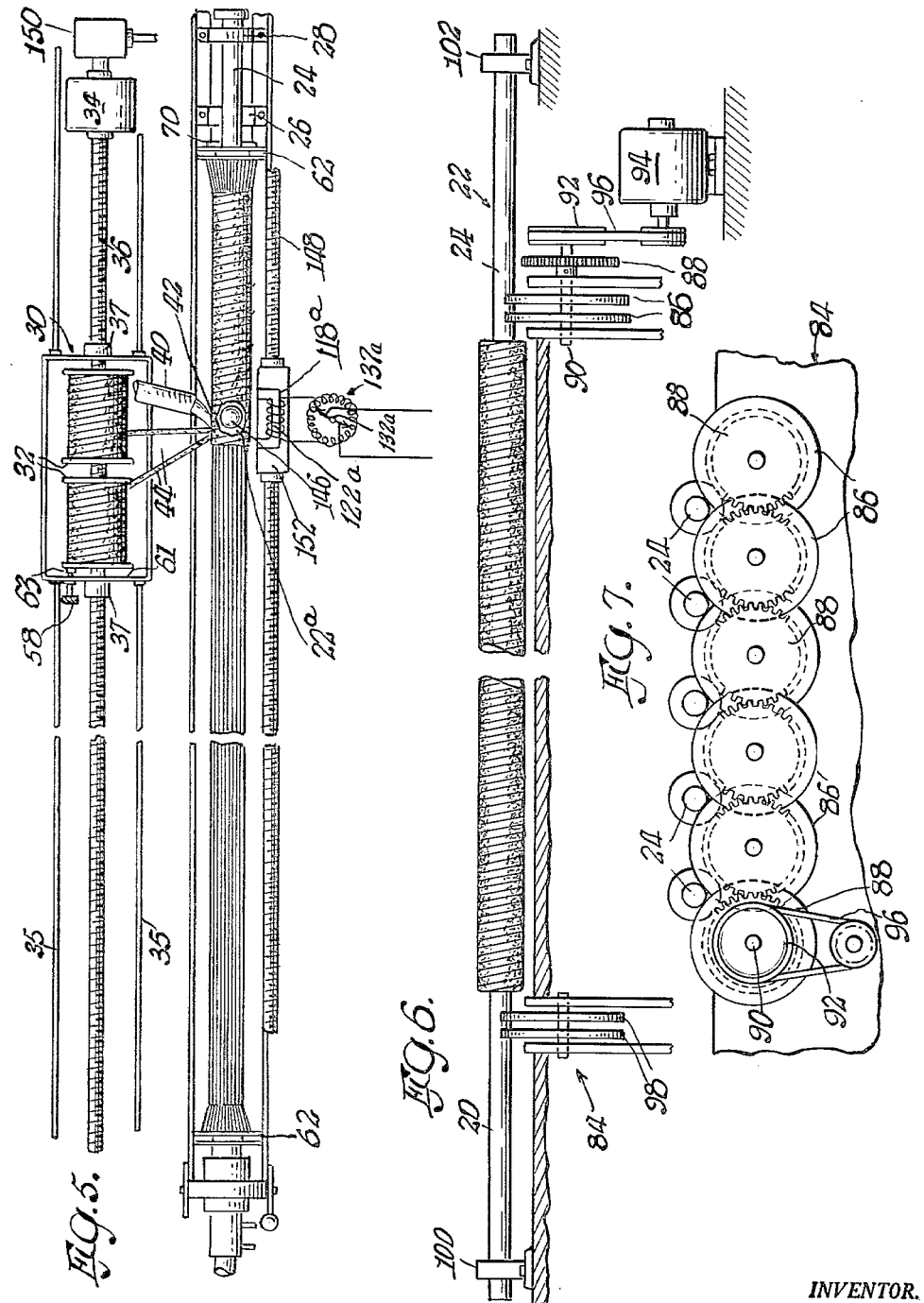
INVENTOR.
Vesta F. Michael

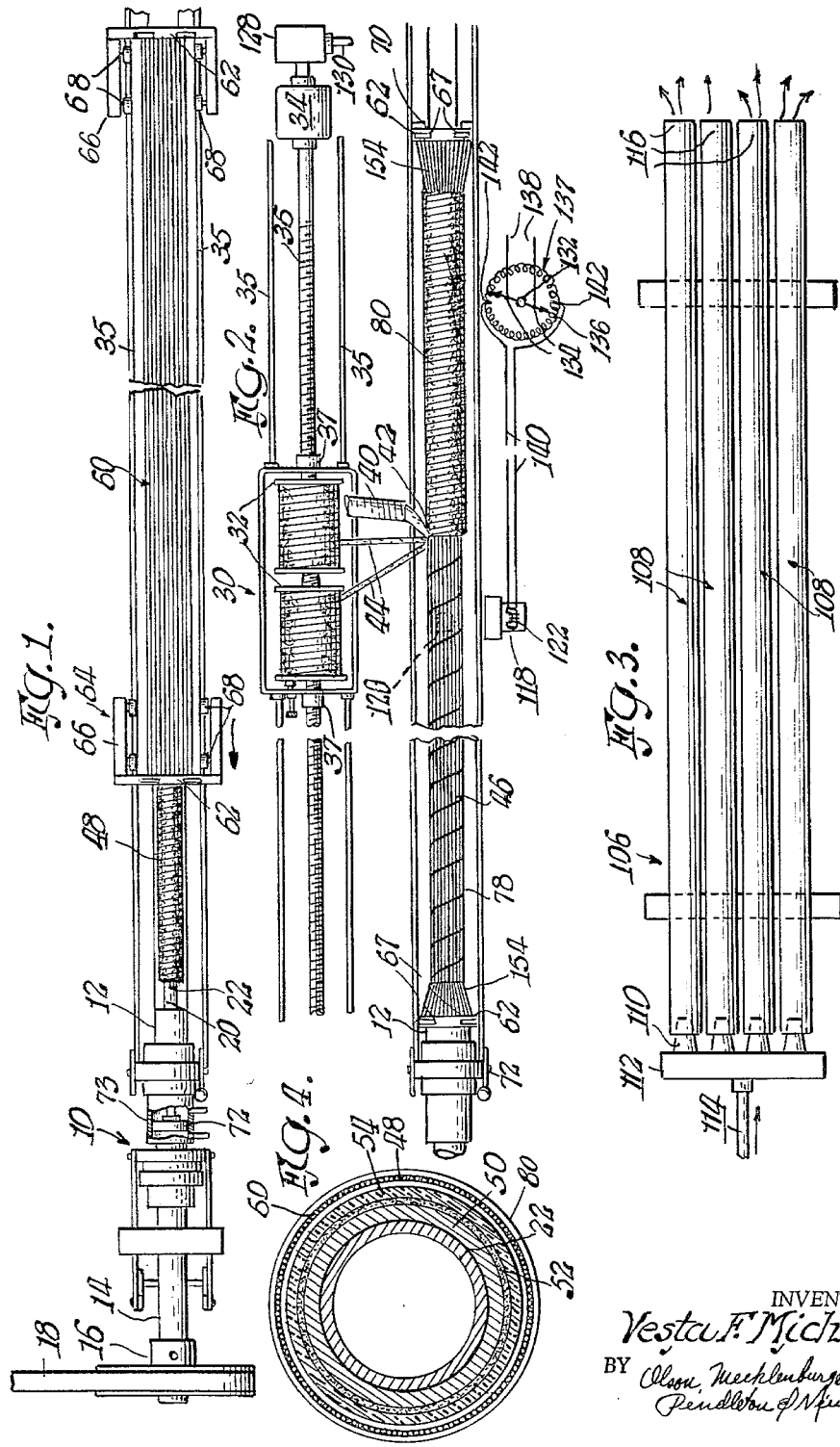

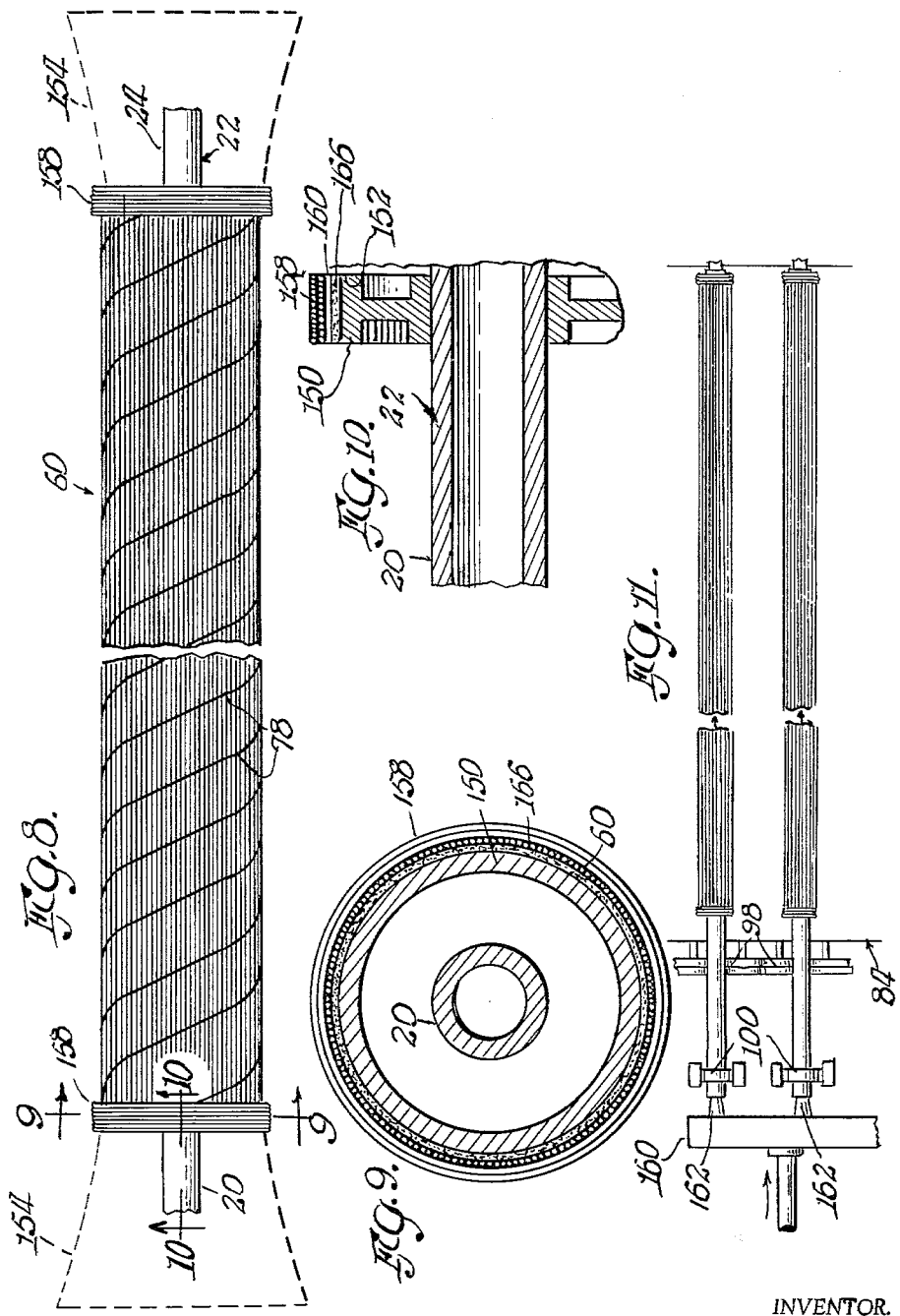

3,202,560
PROCESS AND APPARATUS FOR FORMING GLASS-REINFORCED PLASTIC PIPE
Vesta F. Michael, Wichita, Kans., assignor to Rock Island Oil & Refining Co., Inc., Wichita, Kans., a corporation of Kansas
Filed Jan. 23, 1961, Ser. No. 84,069
14 Claims. (Cl. 156—162)

This invention relates to apparatus and a method for forming pipe and more particularly pertains to apparatus and a method for forming glass-reinforced plastic pipe.

The superiority of glass-plastic pipe over conventional metal pipe in a number of applications is well known. Glass-plastic pipe, for instance, may conduct many corrosive liquids ordinary metal pipes would be incapable of conveying. In addition to its inertness, glass-plastic pipes also possess the advantages of low weight and a high strength to weight ratio.

Ordinary metal pipes possess properties of strength in accordance with the materials of composition and methods of manufacture employed in making the same. Similarly the particular materials employed in glass-plastic pipe manufacture and the method of combining the same are determinative of the tensile strength, burst strength and other strength properties of the pipe.

It is an object of this invention to form a plastic-glass roving pipe possessed of excellent strength and adaptable for a multitude of uses.

It is another object of this invention to provide a novel method of pipe manufacture which comprises a minimum number of simple steps which may be varied for purposes of obtaining resulting pipes possessed of particular strength properties.

It is a further object of this invention to provide novel pipe-making apparatus which insures the production of glass-plastic pipes of uniformly excellent quality.

The above and other objects of this invention will become more apparent from the following detailed description when read in the light of the accompanying drawing and appended claims.

In one embodiment of this invention a helical paper liner is disposed about a mandrel periphery and covered with a paraffin layer and an overlying layer of resin, such as epoxy resin. The outer resin layer is cured prior to the application of a spiral wrap thereto of glass roving. The roving wrap is impregnated with epoxy resin in a readily curable condition simultaneously with the application to the cured resin layer. The mandrel rotates and pulls the roving from spools therefor mounted on a reciprocally movable platform which moves along the length of the mandrel. The spool rotation is friction retarded or the spool is otherwise accommodated so that the mandrel may pull the roving therefrom under a desired tension.

Following application of a spiral wrap, a cylindrical assemblage of parallel roving strands secured at opposed end limits to anchor rings is disposed about the mandrel and spiral wrap already formed thereon. The collars are set in fixed positions adjacent to and in concentric relationship with lathe portions of the pipe-forming apparatus which engage and rotate the mandrel. Following locking of the anchor rings in place, they are moved apart a predetermined distance to place a desired tension on each of the longitudinal strands. In this stressed condition another resin-impregnated spiral wrap is disposed about the periphery of the strand assemblage. As many spiral wraps and longitudinal strand assemblages are disposed about the mandrel as are deemed necessary to obtain desired strength in the ultimate pipe product.

Following application of the final roving layer, which is normally a spiral layer, the pipe and mandrel assembly is placed on a curing table, possessing rotatable bearings which engage opposed end portions of the mandrel. Disposed above the table is a source of radiant heat, such as heat lamps which may be employed for effecting a preliminary cure of the resin component of the pipe, as the same rotates thereby assuring uniform disposition of the cured resin about the final pipe periphery.

The pipe having the resin therein partially cured by heat applied to the exterior thereof is then disengaged from the mandrel. The mandrel removal is readily accomplished because of the paper liner which obviates pipe-mandrel sticking. Saturated steam or other fluid sufficiently hot to melt the paraffin is then flowed through the pipe interior. The latter passage of steam or other hot fluid concomitantly effects a final resin cure, melts the paraffin layer immediately adjacent the paper liner and dissolves the glue securing the paper helices together. The paper liner may then be readily removed as a unit by pulling on either end thereof. The resulting cured pipe has a smooth inner surface and is possessed of desired strength properties.

It has been found that a mandrel employed in making, for instance, a twenty foot length of pipe sags at the center by virtue of its own weight when suspended at each end in a horizontal position. The heavier the mandrel the greater the curvature or central deformation which increases as the pipe is built up thereon. Such curvatures could result in shear fault lines which appear in the finished cured pipe, particularly in the central portion thereof. To alleviate the curvature problem double point suspensions are employed for opposite end portions of the mandrel as will hereinafter be described in greater detail. However, when glass roving under tension is being wound on a lightweight mandrel at a high speed, the mandrel deforms or bends with the applied pressure exerted on the mandrel by the spiral roving at the point of application. To counteract the bending of the mandrel a magnetically attractable center section is employed in the mandrel and an electro-magnet disposed opposite thereto whereby the mandrel is interposed between the electro-magnet and the roving spools. Since the mandrel deformation increases as the mandrel center is approached and decreases as the mandrel ends are approached, the magnitude of the attractive forces of said electro-magnet may be governed in accordance with the point of roving application to the mandrel, as will also hereinafter be explained in greater detail.

For a more complete understanding of this invention, reference will now be made to the drawing wherein:

FIGURE 1 is a fragmentary top plan view of apparatus for making one form of the plastic pipe of this invention;

FIG. 2 is a fragmentary top plan view similar to FIG. 1 illustrating in addition a movable platform for holding spools of glass reinforcement and an electro-magnet assembly employed for minimizing mandrel bending;

FIG. 3 is a fragmentary top plan view of apparatus employed for passing steam through the interiors of plastic pipes of this invention;

FIG. 4 is an enlarged sectional view of a completed pipe member disposed on a rotatable mandrel;

FIG. 5 is a fragmentary top plan view similar to FIG. 2, illustrating a modified form of electro-magnet assembly for preventing mandrel bending in the normal course of plastic pipe formation;

FIG. 6 is a fragmentary side elevational view illustrating a form of curing table which may be employed in the course of curing glass-plastic pipe of this invention;

FIG. 7 is a fragmentary end elevational view of the curing table illustrated in FIG. 6;

FIG. 8 is an enlarged, fragmentary side elevational view of a longitudinal strand assemblage anchored at opposed end portions to anchor rings abutting against opposed end portions of a mandrel member;

FIG. 9 is an enlarged sectional view taken along line 9—9 of FIG. 8;

FIG. 10 is an enlarged, fragmentary sectional view taken along line 10—10 of FIG. 8; and FIG. 11 is a fragmentary top plan view of a curing table and auxiliary apparatus for heating the interior of hollow mandrels as the pipe members disposed thereon are cured.

Referring now more particularly to FIG. 1, apparatus 10 for forming a glass-reinforced plastic pipe is illustrated. Apparatus 10 is similar to a well known type of lathe and comprises no part of this invention; accordingly, it is not illustrated in great detail. Basically, the illustrated apparatus comprises a rotatable collet 12 connected to a drive shaft 14, the latter shaft having affixed to a distal end limit thereof drive pulley 16 which engages a drive belt 18, the latter belt in turn being driven by a motor or other motive means not illustrated. Collet 12 engages a reduced end portion 20 of a mandrel 22, about which a glass-reinforced plastic pipe of this invention is to be formed. A reduced mandrel end portion 24 oppositely disposed to end 20 is more clearly seen in FIG. 5. It will be noted from this latter figure that portion 24 rests on a half bearing 26 and a spaced roller bearing 28. Thus, end portion 24 of mandrel 20 is suspended in apparatus 10 at two spaced-apart bearing points. At the opposite mandrel end limit, a substantial length of the mandrel end portion 20 is locked within collet 12 and rotated thereby.

It has been found that lightweight mandrels composed of aluminum or other lightweight metal are especially desirable in the normal course of glass-reinforced, plastic pipe manufacture. The lightweight metals of composition from which mandrels are preferably fabricated greatly facilitate the manner in which the mandrels may be handled throughout the course of pipe formation. The light weight of the mandrel facilitates preliminary handling thereof in the course of which a paper wrap and parting agent are applied thereto. These initial processing steps may require moving of the pipe into at least two stations where the paper and parting agent are applied. Following application of the parting agent, the pipe may be moved again to a third station whereat a hardenable resinous coating is applied to the outermost mandrel layer and may then be removed to a curing zone. The mandrel and layers thereon must again be moved to apparatus for the remaining pipe-forming operations. Following pipe formation on the mandrel, the same is removed from the apparatus. In view of the large number of mandrel movements, hereinafter described in detail, low mandrel weight is desired.

However, inasmuch as rather long lengths, such as twenty feet or more, of pipe are made as a unit the lightweight mandrels have a tendency to sag at the center portion thereof from their own weight. Such bending becomes more pronounced as the weight supported by the mandrel in the form of the built-up pipe increases in the normal course of pipe manufacture. The mandrel flexing action causes shear fault lines in the finished cured pipe if preventive measures are not taken. One remedy eliminating this situation takes the form of bearings which engage extensive portions of the mandrel at opposed ends limits, as will be noted from FIGS. 1 and 5. If lengths of portions 20 and 24 of mandrel 22 equivalent to approximately ten to fifteen percent of the length of the pipe being formed are supported at opposed end limits of the mandrel, deleterious sagging of the pipe is avoided. Engagement of the desired lengths of the opposed mandrel end limits may be by a collet, such as collet 12 of FIG. 1, or the double bearing arrangement of FIG. 5. In either of the latter two arrangements, by engaging a mandrel end portion which is between ten to fifteen percent of the pipe-forming portion of the mandrel, objectionable sagging of the mandrel is eliminated.

In one method of pipe formation, glass roving under tension is helically wound about a rotating mandrel, such as mandrel 22 of the drawing. Glass roving has been found to be especially satisfactory for use in the formation of a plastic pipe wherein the glass functions as a reinforcement. Inasmuch as the individual glass filaments in roving are in untwisted relationship, any forces directed along the longitudinal axes of such filaments are reacted to with the complete tensile strength of the filaments. If, however, the glass filaments were in twisted relationship, longitudinal forces exerted thereon would effect relative cutting action between the fibers or filaments in twisted relationship.

The glass roving applied to the rotating mandrel 22 may be withdrawn from spools, such as spools 32 illustrated in FIGS. 2 and 5, which are mounted on a movable platform 30 which reciprocally moves along the length of the mandrel 22. The platform 30 may be reciprocally moved by any of a number of conventional means. In FIGS. 2 and 5 the platform is depicted as being reciprocally moved by a reversible motor 34 which rotatably drives in either direction of rotation an elongate worm 36 which threadedly engages internally threaded platform supports 37, whereby longitudinal motion of the platform along to the worm is effected. Guide bars 35 assist in maintaining desired horizontal disposition of platform 30. Also mounted on platform 30 may be a resin dispensing means schematically illustrated in FIG. 2 as a tube 40 in which a curable resinous material, such as an epoxy resin admixed with hardener, flows from lower tube end limit 42 onto roving strands 44 simultaneously with the roving application to the rotating mandrel in the manner illustrated in FIG. 2. A detailed description of a resin dispensing apparatus which may be employed for purposes of forming a glass-reinforced plastic pipe is set forth in my copending application S.N. 84,232, filed January 23, 1961.

It will be noted from FIG. 2 that the helical windings of the roving 44 are applied to longitudinal roving strands 46 which have been tied to an initial spiral wrap 48 first formed on mandrel 22 and more clearly seen in FIG. 1.

In the normal course of pipe manufacture a mandrel, such as the illustrated mandrel 22, has disposed thereover a snug-fitting paper liner 50 which will serve to facilitate removal of the completed pipe product from the mandrel. The various layers applied to the rotating mandrel 22 may be clearly seen from the sectional view of FIG. 4. Following application of a paper liner or other liner member which facilitates removal of a completed pipe from the mandrel, a paraffin layer 52 is applied to the paper liner 50 and allowed to solidify. A substantially pure paraffin composition having a melting point of approximately 150° F. has been found satisfactory when applied in a thin uniform layer approximately 10 mils in thickness. Such paraffin coating is presented for purposes of illustration only.

Following application of the paraffin layer, a silica-thickened epoxy resin composition is applied to the solid paraffin layer to form an overlying layer 54. This epoxy resin layer (or layer of other desired resinous material) is cured for about thirty to forty minutes at an elevated temperature, such as may be produced by the radiant heat emanating from a heat lamp. A first spiral wrap 48 of glass roving is then applied to the cured resin layer 54 by means of the apparatus illustrated in FIGS. 1 and 2. An illustrative resin composition which may be applied over the paraffin comprises 100 parts by weight epoxy resin, 12 parts by weight hardener, such as triethylene tetramine, and 9 parts by weight of a thixotropic agent, such as the silicate Cab-O-sil. The thickened mixture is applied at room temperature to the rotating paraffin surface with a trowel until a thickness of about 10 mils is uniformly formed thereover.

Accordingly, after the epoxy or other resinous layer 54 has cured, the mandrel ends 20 and 24 are locked in position on the illustrated apparatus of FIGS. 1 and 2. Roving ends from spools 32 mounted on platform 30 then engage one end limit of the mandrel pipe-forming surface and as the mandrel rotates, driven indirectly by motive means not illustrated, roving 44 is pulled from the spools 32 as the spools move along the length of the mandrel on platform 30. As above mentioned, simultaneously with roving application to the mandrel, uncured resin and hardener flow from end limit 42 of resin dispensing apparatus 40 completely impregnating the roving fibers as the same are applied in helical form to the mandrel.

After the platform 30 is moved along the entire length of mandrel 22, a complete spiral layer 48 in which the various spirals are in overlapping relationship is formed on the cured resin layer 54 of the mandrel assembly. The spiral roving layer is applied under tension by being pulled from spools 32 by the rotating mandrel. Any of various means will assure the application of the roving under a predetermined tension to the outer surface of the mandrel and layer assembly. One such means comprises bolts 58 (see FIG. 5) which threadedly engage a support plate 61 and frictionally engage the sides of spools 32 by means of end limits 63 composed of an asbestos or equivalent long-wearing composition. By being applied under tension, the individual fibers of helical layer 48 are possessed of greater strength in resisting any outwardly radiating pressures which may exist on the inside of the ultimately formed pipe when said pipe is placed in a normal position of operation. The spirals of roving are also preferably disposed at substantially right angles to the mandrel longitudinal axis. Such a spiral disposition enables the roving fibers to more efficiently react to outwardly radiating pressures exerted within the pipe. It is apparent that the spiral roving layer, however, does not afford the completed pipe member any tensile strength in a direction parallel to the longitudinal axis of the pipe. Accordingly, assemblages of parallel roving strands of equal length are incorporated in the pipe being formed, such as layer 60 illustrated in the sectional view of FIG. 4. The elongate strands of layer 60 will obviously afford resistance to any forces exerted along the longitudinal axis of the completed pipe member tending to place said pipe under tension.

FIG. 1 illustrates an elongate assemblage 60 in the course of being moved into a position surrounding the already formed initial spiral layer 48. The opposed end limits of the elongate assemblage 60 are secured to anchor rings 62, more clearly seen in FIGS. 2 and 5. In the course of moving over the partially formed pipe, anchor rings 62 are mounted on a movable trolley 64 illustrated in FIG. 1 having truck portions 66 mounted on wheels 68 defining opposed end limits thereof. After assemblage 60 has been moved into desired position relative to the initially formed spiral wrap 48, rings 62 are locked in position by bolts 67 of FIG. 2 or conventional clamping devices on portions of the illustrated apparatus 10, such as collet 12 and a lock collar 70, more clearly seen in FIG. 5. Anchor ring 62 may also be of lesser diameter than the larger diameter portion of mandrel 22 and merely abut against one end limit of the larger diameter portion. After the anchor rings have been mounted at opposed end limits on collet 12 and collar 70 by means of locking bolts or the like, a pneumatic piston 72 in cylinder 73 of apparatus 10, is actuated for moving collet 12 a predetermined straight-line distance away from anchor ring 62 mounted on collar 70. By virtue of this latter movement, the individual strands of the assembly 60 are placed under uniform tension inasmuch as all of the strands 60 are of substantially equal length. In my copending application S.N. 83,996, filed January 23, 1961, now Patent No. 3,080,700, apparatus is described for forming assemblages, such as assemblages 60, in which all of the roving strands are of precisely equal length.

It is desired that each strand of assemblage 60 be incorporated in the formed pipe under tension inasmuch as such tension will enhance the strength of the ultimate pipe product, since such tension may be employed in reacting to forces exerted along the longitudinal axis of the pipe product producing a tension in the pipe itself.

After the assemblage anchor rings 62 are locked in place in the manner of FIG. 2, a spiral wrap of glass roving 78, in which the helices thereof are spread apart a substantial distance from each other, as illustrated in FIG. 2, is wound about the strand assemblage 60. Thus, the assemblage 60 which was of somewhat larger diameter than the partially formed pipe (the outer diameter of which was defined by initial spiral roving layer 48) may be reduced in diameter and lie in overlying contact with helical layer 48. After the strand assemblage 60 is disposed relative to the spiral layer 48 in the manner illustrated in the lefthand portion of FIG. 2, a second spiral wrap 80 is applied over assemblage 60. As was the procedure with the application of initial spiral wrap 48, resin in a readily curable state is simultaneously applied to the spiral roving as it covers the assemblage 60, as illustrated in FIG. 2. Sufficient resin is applied so that both the longitudinal and helical roving strands are completely impregnated with the resin dispensed from holder 40. Complete impregnation is essential if a strong pipe product is to be obtained. Complete impregnation may be assured by dispensing adequate amounts of resin and hardener in a highly fluid condition so that penetration of the roving strands is assured.

Although the sectional view of FIG. 4 illustrates a pipe product in which two helical layers straddle an interposed longitudinal assemblage 60 of roving strands, as many helical layers or longitudinal layers are employed in the pipe as are deemed necessary for imparting to the pipe desired strength properties.

Accordingly, if the pipe being formed is intended to convey fluids under high pressure, a high burst strength is desired and, accordingly, more helical layers are desired than longitudinal layers since it will be the helical strands of glass which will be reacting to the radial forces exerted on the pipe wall when such pipe is in a normal position of use. On the other hand, if the completed pipe is to be subjected to severe tensile forces, such as may be exerted on a pipe hung in a deep well, a large number of longitudinal assemblages will be employed in such pipe since great tensile stresses will be exerted on the pipe in the vertical position parallel to the longitudinal axis of the pipe. The pipe of FIG. 4, therefore, is presented only by way of illustration. However, it should be noted that the innermost and outermost layers of glass roving should be in helical form to obviate any possibility of fiber unraveling and resulting pipe deterioration. The overlapping helices of each helical layer perform a self-locking function which assists in the production of a pipe product free of protruding glass ends.

Following completion of the pipe formation on illustrated apparatus 10, the mandrel 22 is removed and placed on a curing table, such as that fragmentarily illustrated in FIG. 6. Since the resin employed in the formation of the pipe and which has been applied over the cured resin layer 54 has not yet completely cured, the mandrel and layers formed thereon may be placed under a radiant heat source, such as heat lamps, and while exposed to such radiant heat for about thirty to forty-five minutes the mandrels are continuously rotated by means, such as table 84 of FIG. 7.

Table 84 utilizes drive wheels 86 geared to each other by means of sprockets 88 and a drive shaft 90 on which one of the sprockets 88 is mounted. Also mounted thereon is a drive pulley 92, illustrated in FIG. 6, which is driven by means of motor 94 through connecting belt 96. Accordingly, by rotatably driving sprocket 88 mounted on shaft 90, all of the drive wheels 86 are rotatably driven and a mandrel elongate end portion, such as portion 24 resting on two drive wheels 86, will be rotatably driven thereby. Mounted on table 84 at the end limit thereof oppositely disposed to wheels 86 are idler wheels 98 which rotate with driven end limit 20 of the illustrated mandrel 22 of FIG. 6.

As has been above mentioned, by suspending the mandrel end portions 24 and 20 so elongate portions thereof are supported in the course of rotation, sagging of the curing pipe is eliminated and the pipe resin component is cured without the formation of shear lines which affect the appearance and strength of the final pipe product. In FIG. 6 a double point suspension is effected by roller bearing 100 and idler wheels 98 which engage portion 20 of the illustrated mandrel. Double suspension is effected on mandrel portion 24 of the illustrated mandrel by drive wheels 86 and split roller bearing 102, which engage the opposed end portion of the illustrated mandrel.

Since the mandrel 22 is continuously rotated in the course of effecting a preliminary resin cure, the resin is uniformly distributed about the pipe periphery and the pipe accordingly is of uniform strength about its periphery. The mandrel 22 is then withdrawn from the partially cured pipe. The withdrawal is facilitated by paper liner 50 which enables the mandrel to readily slip from the illustrated assembly of FIG. 4.

The partially cured pipe is then placed on a final curing table, such as table 106 of FIG. 3. Each pipe 108, which is partially cured, is attached at one end limit to an outlet 110 of a header 112 to which steam is piped by means of a line 114. Each outlet 110 snugly engages one end portion of each pipe 108 so that steam passing from pipe 114 may be distributed through outlets 110 and forced along the length of the interior of each pipe 108. In the course of so passing, the steam melts the paraffin layer 52 which was originally applied over paper liner 50 of the pipe assembly and wets the paper liner so that the adhesive securing overlapping helices thereof together is dissolved. After steam has passed through the pipes for a sufficient amount of time (approximately one and one-half hours using saturated steam), the end limit of the paper liner 50 disposed at end portion 116 of each pipe from which steam is exiting is engaged by a pliers or other instrument and readily pulled as a unit from the interior of the pipe in which disposed. The passage of the steam through the pipe members not only serves to melt the paraffin 52 so that paper liner 50 may be readily removed, but in addition the steam passage effects a secondary final cure of the resin in pipes 108. As previously described, the rotating pipes were subjected to radiant heat which passed through the pipe from the exterior surface thereof. The steam passage through the pipe interiors in the manner illustrated in FIG. 3 enables heat to be applied directly to the inner peripheral wall of each pipe from which the heat may be conducted to the outer peripheral wall of each pipe. The cured pipe members may then be threaded at opposite end limits or secured to discrete coupling members whereafter the pipe members are ready for use.

As was previously described, in the normal course of pipe formation the mandrels 22 which are preferably lightweight are engaged by roving strands 44 applied under tension to the rotating mandrel as illustrated in FIG. 2. The tension in the strands 44 is sufficient to flex the portion of the mandrel to which the roving is being applied and move the same out of longitudinal alignment with the remaining portions of the mandrel. Such flexing or bending is objectionable inasmuch as shear lines will form in the cured plastic resulting in an unattractive appearance and low pipe strength.

The flexing of the mandrel and partially formed pipe disposed thereon increases to a maximum as the center of the mandrel is approached by the movable platform 30, as illustrated in FIG. 2. Flexing of the mandrel decreases as the supported end limits of the mandrel are approached by the platform 30 and roving spools 32 disposed thereon. In an effort to counteract flexing action by pulling of the roving strands 44 an electro-magnet 118 is disposed oppositely the center of the mandrel on the side of the mandrel oppositely disposed to the movable platform 30 whereby the mandrel is interposed between the mandrel platform and the electro-magnet 118.

If the mandrel 22 is composed of a nonmagnetic material of composition such as aluminum, an iron insert such as insert 120 is placed in the center of each mandrel, as indicated in FIG. 2, so that the same may be disposed directly opposite to electro-magnet 118. Therefore, in the normal course of operation, to counteract mandrel deflection effected by tension in roving strands 44, winding 122 disposed about magnet 118 is energized with current of a magnitude in direct proportion to the deflection forces being exerted on the mandrel by the tensioned roving 44. It is seen, therefore, that current applied to magnet windings 122 should approach a maximum as platform 30 approaches the center of mandrel 22 and decrease to a minimum as opposed end portions of mandrel 22 are approached by platform 30.

One arrangement for controlling current input into magnet winding 122 is schematically illustrated in FIG. 2. Motor 34 which drives worm 36 on which platform 30 is mounted may also drive a gear disposed in a gear reducer box 128 illustrated in FIG. 2. An output shaft 130 from box 128 may drive a shaft 132 to which double tap arms or wipers 134 of a resistor wire 136 are secured. The lines 138 comprise power input lines. The resistance wire 136 of a potentiometer 137 is in communication with winding 122 of electro-magnet 118 by means of lines 140. When wiper arms 134 engage points 142 of the potentiometer, current to magnet 118 is at a maximum. The wiper arms will contact points 142 when rovings 44 are applied to the center of mandrel 22 and bending forces produced by the roving are at a maximum. Motor 34 which drives platform 30 is thus geared to shaft 132, on which wiper arms 134 are mounted so that current input to winding 122 of magnet 118 is at a maximum when platform 30 is at the center of the mandrel, and at a minimum when platform 30 is at opposed end portions of the mandrel.

FIG. 5 illustrates a modified system for preventing and counteracting mandrel bending effected by helically wound roving strands 44 being applied under tension. In FIG. 5 it will be seen that a ball 146 of magnetically attractable material, such as iron or the like, is disposed within a hollow aluminum mandrel 22a. Electro-magnet 118a is simultaneously movable with platform 30 in directly opposite relationship therewith inasmuch as it is mounted on a drive worm 148 which is simultaneously driven by motor 34. Electro-magnet 118a may also be directly supported through a connecting arm to platform 30. As was the case in the assembly of FIG. 2, shaft 132a of illustrated potentiometer 137a is rotatably driven through a gear box, 150. Thus, the current input to electro-magnet winding 122a is correlated with the positions of platform 30 and mounting 152 holding electro-magnet 118a. Therefore, as the electro-magnet 118a and platform 30 move along the length of the hollow mandrel 22a, ball 146 is continuously attracted by electro-magnet 118a and the attraction becomes greater as the electro-magnet and platform 30 approach the center of the mandrel.

FIGS. 8 through 11 illustrate apparatus whereby the end portions of longitudinal strand assemblages, such as the previously discussed assemblages 60, may be fixedly anchored at opposed end limits and the longitudinal tension in said strands increased in the normal course of pipe curing.

In FIG. 8 a longitudinal strand assemblage 60 is depicted disposed about the periphery of a partially formed glass-reinforced plastic pipe member which is, in turn, disposed about the outer periphery of a mandrel 22. Mandrel 22, as will be more clearly seen from FIG. 10, is hollow and has ring members 150 abutting against opposed shoulders 152 comprising the annular surfaces or shoulders defining the juncture of the main central pipe-forming surface of each mandrel with the reduced diameter terminal portions 20 and 24 of the mandrel 22. In FIG. 10 one ring 150 is depicted in abutting engagement with shoulder 152; an identical ring 150 which is covered with helical windings is employed in FIG. 8 on end portion 24 of the illustrated mandrel 22.

It is the function of the rings 150 to serve as anchors for longitudinal strand assemblages, such as the assemblage 60 illustrated in FIG. 8. As was previously described above in the discussion of FIGS. 1 and 2, longitudinal strand assemblages are alternated with helical layers 48 of a glass-reinforcement which are disposed about mandrel 22 in the normal course of pipe formation.

As was also described above and as will be most clearly seen from FIG. 2, the opposed terminal ends of the longitudinal strand assemblages are secured to anchor rings 62 which are locked in place on a collet 12 and anchor 70 of apparatus 10 in the normal course of pipe formation. After anchor rings 62 are securely locked in place, piston 72 is actuated for purposes of increasing the interval between anchor rings and effecting a tension on each of the longitudinal strands comprising the assemblage 60.

After the pipe has been formed the tapered longitudinal strand portions 154 illustrated in FIG. 2 interconnecting the anchor rings with the terminal portions of the longitudinal strands disposed on the main mandrel surface are cut in order to free the completed or partially completed pipe from the anchor rings 62. This may be readily effected by merely holding a knife in the path of strand portions 154 as the mandrel rotates.

As was also above described, when the completed pipe is removed from the pipe forming apparatus for transfer to the curing table, the resin component of said pipe has not yet been completely hardened. Since the opposed end portions of the longitudinal strands are no longer fixedly locked in place to an anchoring device, and since the resin has not yet cured, it oftentimes happens that the tension originally imparted to the longitudinal strands is lost as the longitudinal strands slip within the uncured resin between the helical strand layers for purposes of returning to their original length prior to the exertion of tension thereon.

Rings 150 illustrated in FIGS. 9 and 10 comprise anchoring devices which enable the longitudinal strands of an uncured completed pipe member to retain the initially imparted tension occasioned by the piston apparatus 10 and, in addition, enable further tension to be imparted to the longitudinal strands in the normal course of pipe curing.

When rings 150 are employed, a plurality of roving helical windings, such as windings 158 of FIG. 8, are disposed about the outer periphery of each ring 150 to securely lock the longitudinal strand terminal portions about the peripheries of the opposed rings. Consequently, after the pipe has been completely formed on apparatus 10 of FIGS. 1 and 2 and is ready for transfer to the curing table 84 of FIG. 6, although strand portions 154 are cut, the tension in the strands making up each assemblage 60 is not lost because of the locking action of the helices 158 disposed about rings 150.

In addition, inasmuch as each mandrel 22 employed in conjunction with the rings 150 is hollow, it is possible in the course of curing on a device such as curing table 84 to heat the interior of the hollow mandrels so that the metal mandrel will longitudinally expand. Inasmuch as the coefficient of linear expansion for a metal such as aluminum, which is normally employed in mandrel manufacture, is much greater than any expansion which might be imparted to the glass roving as a result of the heating thereof in the course of curing, the mandrel expansion will effect additional longitudinal tension in the roving strands. The anchor helices 158 disposed about the outer periphery of each ring 150 will prevent slippage of the longitudinal strands within the pipe structure during mandrel expansion. Although FIGS. 8 through 11 illustrate pipe members in which the outermost roving layer is composed of longitudinal strands, such longitudinal strands are illustrated for clarity of explanation since the final roving layer employed in the normal course of pipe manufacture is helical and not longitudinal.

In FIG. 11 a header 160 is illustrated having outlets 162 which enter but do not necessarily contact rotating end portions 20 of the illustrated mandrels 22. As the resin component of the pipe illustrated in FIGS. 8 through 11 is curing, as the result of the heat passed through the hollow center of the mandrel 20 (and any other applied heat), the glass roving 60 is under great tension which is desirable in the final cured pipe product for strength purposes.

After the pipe has been completely cured, the strands are locked in the resin and the portion of the pipe formed about each ring 150 must be severed from the main pipe portion disposed about the outer periphery of the mandrel 22. Such separation may be readily effected by cutting with a saw or equivalent means about annular shoulders 152 defining the interface between the rings and the mandrel. To facilitate removal of whatever pipe portion has been formed about the periphery of each ring 150, a parting agent, such as a wax 166, more clearly seen in FIG. 10, may be disposed about the outer peripheral surface of each ring 150 prior to utilization of the rings on the illustrated mandrel. The wax will melt only after the resin has been substantially cured. The number of longitudinal layers may, of course, vary in a pipe.

It may be possible to tie and anchor the opposed end portions of the longitudinal assemblages directly to the mandrel without employing anchor rings if the opposed enlargements are not objectionable on the pipe periphery.

It is seen, therefore, that by employing rings 150 in conjunction with the mandrels 22, it is possible to insure against slippage of the longitudinal strands in the normal course of curing whereby the tension of said strands is lost and, in addition, such rings by being forced apart in the normal course of mandrel expansion effect the imparting of additional tension to the longitudinal strands of each assemblage 60 in the manner above described.

An apparatus has thus been provided for manufacturing a glass-reinforced plastic pipe in which uniformity is assured in the pipe products produced. The apparatus above described is composed of simple elements and the arrangement of the glass-reinforcement in the pipe product assures maximum strength whereby pipes may be readily formed to serve particular purposes and to resist particular stresses which will be exerted thereon.

The method of pipe manufacture above described employs a minimum number of process steps and substantially completely obviates many difficulties heretofore experienced when pipes of this type have been made and handled. It is apparent from the foregoing that a number of modifications may be made in the illustrated apparatus and pipe which are given by way of illustration and, accordingly, this invention is to be limited only by the scope of the following claims.

I claim:

1. In a process for forming a glass roving-resin pipe, the steps comprising applying a solidifiable coating of low melting point to a pipe form having a center section of magnetic susceptibility, allowing said coating to solidify, applying a coating of curable resin having a higher melting point than that of said solidifiable coating in the cured state to said latter coating, curing the resin coating, applying helical wraps of glass roving under tension along the length of said pipe form over said cured resin coating, said tension being of such magnitude as to cause deformation of said pipe form, said deformation increasing as the pipe form center is approached and decreasing as the pipe form ends are approached, applying additional uncured resin to said helical wraps of glass roving so as to impregnate the same, exerting increasing magnetic forces of attraction on the center section of said pipe form in direct opposition to the deformation forces exerted on said pipe form by said roving wraps as the center thereof is wrapped by said helical wraps, and decreasing said magnetic attractive forces as said pipe form ends are wrapped by said helical wraps of impregnated glass roving, curing the additional resin impregnating said roving after a pipe of desired thickness has been formed, applying heat to the pipe form interior to melt said coating of low melting point, and removing the pipe from said pipe form.

2. In an apparatus for forming a substantially straight, elongate tubular member on a hollow mandrel; said tubular member being formed at least in part from longitudinally disposed roving, and helical wrappings which are wound about said mandrel under such tension along the length of said mandrel as to bend said mandrel, the combination comprising a rotatable mandrel fabricated of material which expands upon heating, mountings for said mandrel engaging opposed end portions thereof, means for applying a helical wrap to said mandrel along the length thereof under such tension as to pull the engaged portions of the mandrel out of longitudinal alignment with the remainder of the mandrel toward the applying means, non-alignment of the engaged portion of the mandrel being at a maximum at said mandrel center and at a minimum at opposed mandrel end limits, a central portion of said mandrel being magnetically attracted, electromagnetic means exerting attractive forces on said magnetically attracted portion in opposition to said forces exerted by the wrap-applying means whereby said mandrel may remain substantially straight in the normal course of apparatus operation, means for energizing said electromagnetic means whereby the same will exert an attractive force on said magnetically attracted means in accordance with the point of engagement of said wrap on said mandrel, anchor means abutting opposed end portions of said hollow mandrel for engaging opposed end portions of longitudinal roving strands, means for applying a heat hardenable material to roving disposed on said mandrel whereby said roving becomes impregnated with said heat hardenable material, and means for heating the interior of said mandrel whereby said mandrel longitudinally expands forcing said anchor means apart thereby increasing the tension in said longitudinal roving strands anchored to said anchor means, the heat applied to the interior of said hollow mandrel by the heating means simultaneously curing said heat hardenable material as said longitudinal strands are under tension.

3. In an apparatus for forming a substantially straight, elongate circular member on a mandrel from helical wrappings wound under such tension along the length of said mandrel as to bend said mandrel, the combination comprising a rotatable mandrel, mountings for said mandrel engaging opposed end portions thereof, means for applying a helical wrap to said mandrel along the length thereof under such tension as to pull the mandrel at the point of wrap application out of longitudinal alignment with the remainder of the mandrel toward the applying means, nonalignment of the mandrel at the point of wrap application being at a maximum at said mandrel center and at a minimum at opposed mandrel end limits, a central portion of said mandrel being magnetically attracted, electromagnetic means exerting attractive forces on said magnetically attracted portion for balancing the forces exerted by the wrap-applying means whereby said mandrel may remain substantially straight in the normal course of apparatus operation, and means for energizing said electromagnetic means to exert an attractive force on said magnetically attracted means in accordance with the point of engagement of said wrap on said mandrel.

4. In a process for forming a glass roving-plastic pipe, the steps comprising applying a parting coating to a rotatable form which is at least in part magnetically susceptible, applying a layer of curable resinous material to said parting coating, curing said resinous material, helically winding glass roving under tension about the length of said rotatable form over said resinous material; concomitantly impregnating the helically wound roving with additional curable resinous material, the helical winding tending to cause a portion of said form to deform and move out of longitudinal alignment with the remainder of the form at the point of winding application, applying a balancing pulling force to a magnetically susceptible portion of said form for counteracting the deformation normally effected by said helical winding, applying a cylindrical assemblage of parallel glass roving strands about said helically wound roving, placing the strands of said assemblage under tension, helically winding glass roving and forming a second helical layer of glass roving under tension about the cylindrical strand assemblage, impregnating both the parallel roving and second helical layer of glass roving with additional curable resinous material, applying heat to the resulting pipe exterior to effect a preliminary cure of said additional resinous material, and applying heat to the resulting pipe interior to effect a final cure of said additional resinous material.

5. In a process for forming a composite pipe, the steps comprising applying a paraffin coating over a pipe form, applying a curable resinous material over said paraffin, curing said resinous material, applying a first spiral wrap of glass roving under tension about the cured resinous layer, impregnating said spiral wrap with said curable resinous material whereby said impregnating resin upon curing may integrally unite with said cured resinous material disposed over said paraffin, disposing a plurality of parallel elongate strands of glass roving arranged parallel to said mandrel longitudinal axis under uniform tension about said spiral wrap and applying a second spiral wrap of glass roving under tension about said parallel strands, said second spiral wrap being impregnated with sufficient curable resinous material to impregnate said second spiral wrap and said parallel strands, and curing said resinous material whereby the resulting pipe comprises a plurality of glass roving strands embedded in a solid mass of cured resinous material.

6. In an apparatus for forming a substantially straight cylindrical member on a mandrel, said member being formed at least in part from helical wrappings wound under such tension along the length of said mandrel as to bend the same, the combination comprising a hollow mandrel of non-magnetically-attractable material, magnetically attractable means movable along the interior of said hollow mandrel disposed in said mandrel, means for applying a helical wrap to said mandrel along the length thereof under sufficient tension to bend the same at the point of application out of alignment with the remainder of the mandrel, electromagnetic means adapted to move along the length of said mandrel in opposed relationship with the point of wrap application to the mandrel, said magnetically attractable means being movable in said mandrel opposite to said electromagnetic means, and means for energizing said electromagnetic means so as to exert a balancing attractive force on said magnetically attractable means in accordance with the point of engagement of said wrap on said mandrel and in opposition to the expected normal mandrel deflection.

7. In an apparatus for forming a substantially straight cylindrical member on a mandrel from wrappings wound under such tension along the length of said mandrel as to bend the same, the combination comprising a hollow mandrel of non-magnetically-attractable material, magnetically attractable means disposed in said mandrel hollow portion movable along the length thereof, means for applying a wrap to said mandrel along the length thereof under such tension as to bend the same at the point of wrap application, an electromagnet movable along the length of said mandrel, motive means for moving said electromagnet along the length of said mandrel in directly opposed relationship with said means for applying a wrap whereby said mandrel is always interposed between said latter means and said electromagnet, and means for regulating the electrical input into said electromagnet controlled by said motive means, the forces of attraction of said electromagnet on said magnetically attractable means in said mandrel being governed by the electromagnet and wrap-applying means positions relative to said mandrel.

8. In a process for forming a glass roving-plastic pipe, the steps comprising applying a solidifiable coating of low melting point to a hollow pipe form fabricated of material which expands upon heating, allowing said coating to solidify, applying a layer of curable resin having a higher melting point than that of said solidifiable coating in the solid state to said latter coating, curing said resin coating, applying helical wraps of glass roving, impregnated with additional curable resin, under tension along the length of said form over said cured resin coating; said tension being of such magnitude as to cause deformation of said form at the point of wrap application, said deformation increasing as the form center is approached and decreasing as the form ends are approached, applying longitudinal strands of glass roving under tension along the length of said form between said helical wraps and anchoring said longitudinal strands at opposed end portions of said form, said form having a center section of magnetically susceptible material, exerting increasing magnetic forces of attraction on said form center section in direct opposition to the deformation forces exerted on said form by said roving helical wraps as the center section thereof is wrapped by said helical wraps, and decreasing said magnetic attractive forces as said form ends are wrapped by said helical wraps of impregnated glass roving, curing the resin impregnating said roving after a pipe of desired thickness has been formed by applying heat to said pipe and form assembly whereby said additional resin is solidified and said form is expanded and additional tension imparted to said longitudinal roving strands in the course of said resin curring, said heat application simultaneously melting said solidifiable coating of low melting point and curing said additional resin, and removing said removable form from said pipe after said resin has cured and said solidifiable coating has melted.

9. Apparatus for forming a glass roving-plastic pipe, the combination comprising a mandrel, anchor means engaging opposed end portions of said mandrel enabling tensioned longitudinal strands of glass roving to be secured at opposed end portions to said anchor means, means for applying a heat-hardenable material to said longitudinal strands whereby said latter strands become impregnated therewith, said mandrel being composed of a material which expands upon heating; and means for heating the mandrel and roving heat-hardenable material assembly whereby said mandrel longitudinally expands increasing the longitudinal distance between said anchor means and said longitudinal roving strands are concomitantly placed under additional tension, said heating means simultaneously curing said heat-hardenable material while said longitudinal roving strands are maintained under tension occasioned by said mandrel expansion.

10. In a process for making a glass-reinforced-resin pipe, the steps comprising applying a curable resin layer about a heat expansible pipe form, curing said resin layer, applying glass reinforcement impregnated with additional curable resin about the cured resin layer, said glass reinforcement consisting of layers of untwisted parallel glass strands disposed transversely to and parallel to the longitudinal axis of said pipe form applied to said form under tension, and heating said pipe form so as to concomitantly impart additional tension to said glass reinforcement and cure said additional curable resin impregnating said glass reinforcement.

11. In a process for forming a glass roving-resin pipe having high burst and tensile strengths, the steps comprising applying a parting layer to a rotatable pipe form, applying a layer of uncured curable resin to said parting layer, curing said layer of curable resin, applying a plurality of layers of untwisted glass roving layers under tension to the cured layer of curable resin, the strands of said glass roving layers lying substantially parallel to and at substantially right angles to the longitudinal axis of said pipe form; applying adequate additional uncured curable resin to said cured resin layer so that said strands of the glass roving layers are saturated therewith whereby said additional uncured resin serves to bond said strands to said cured resin layer, and curing said additional curable resin while said roving layers are maintained under tension.

12. In a process for making a tubular member, the steps comprising applying layers of untwisted glass roving under tension to a rotatable tubular form, which is formed of a material which expands upon heating, the strands of said layers of glass roving lying substantially parallel to and at substantially right angles to the longitudinal axis of said tubular form; said strands of glass roving being in fixed, anchored position relative to said tubular form; applying uncured heat-curable resin to said strands of glass roving in the course of applying the same to the tubular form whereby said strands of roving are saturated therewith, concomitantly curing said uncured resin and expanding said tubular form by the application of heat whereby said glass roving strands are placed under additional tension as said curable resin is cured.

13. In a process for making a tubular member, the steps comprising applying a parting layer to a rotatable pipe form, said pipe form being fabricated of material which expands upon heating, applying a layer of curable resin to said parting layer, curing said layer of curable resin, applying layers of untwisted glass roving under tension to the cured resin layer, said strands of glass roving being fixedly anchored under tension relative to said tubular form, applying uncured curable resin to said strands of glass roving in the course of applying the same to the tubular form whereby said strands of glass are saturated with said curable resin, applying heat to said tubular form so as to expand said form radially and longitudinally and place the tensioned glass roving strands under still greater tension; and curing said uncured curable resin while said tubular form is in the expanded condition whereby said roving strands are embedded in a monolithic cured resin matrix of substantially uniform composition.

14. In a process for making a tubular member, the steps comprising applying a parting layer to a rotatable pipe form, applying a layer of curable resin to said parting layer, curing said layer of curable resin, applying glass roving under tension and additional uncured resin to said cured resin layer while said pipe form rotates; the strands of said roving lying substantially parallel to and at substantially right angles to the longitudinal axis of said pipe form; said additional resin saturating said roving, and curing the additional uncured resin whereby said roving is embedded in a monolithic mass of resin of substantially homogeneous composition.

References Cited by the Examiner

UNITED STATES PATENTS

| | | | |
|---|---|---|---|
| 2,354,556 | 7/44 | Stahl | 156—190 XR |
| 2,402,038 | 6/46 | Goldman et al. | 154—83 |
| 2,690,412 | 9/54 | Nebesar | 154—83 |
| 2,723,705 | 11/55 | Collins | 154—1.8 XR |
| 2,748,830 | 6/56 | Nash et al. | 154—1.8 |
| 2,748,831 | 6/56 | Nash | 154—1.8 |
| 2,782,833 | 2/57 | Rusch | 156—425 |
| 2,794,481 | 6/57 | Anderson | 154—1.8 |
| 2,877,150 | 3/59 | Wilson | 156—190 |
| 2,919,742 | 1/60 | Schubert et al. | 154—1 |
| 2,991,210 | 7/61 | Matkovich | 154—83 |
| 2,993,526 | 7/61 | Young | 156—200 XR |
| 3,068,134 | 12/62 | Cilker et al. | 156—294 XR |

EARL M. BERGERT, *Primary Examiner.*

CARL F. KRAFFT, *Examiner.*